United States Patent
Kuriyama

(10) Patent No.: US 6,259,348 B1
(45) Date of Patent: *Jul. 10, 2001

(54) SURFACE MOUNTING TYPE ELECTRONIC COMPONENT INCORPORATING SAFETY FUSE

(75) Inventor: Chojiro Kuriyama, Kyoto (JP)

(73) Assignee: Rohm Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/267,433

(22) Filed: Jun. 29, 1994

(30) Foreign Application Priority Data

Jul. 9, 1993 (JP) .................................................. 5-170631

(51) Int. Cl.[7] ..................... H01H 85/143; H01H 85/147; H01G 2/16
(52) U.S. Cl. ........................ 337/252; 337/232; 337/248; 337/251; 361/275.4; 361/306.1; 361/309
(58) Field of Search .................................... 361/539, 535, 361/536, 537, 538, 528, 523, 534, 533, 540, 275.2, 275.4, 278, 282, 303, 308.3, 309, 306.1; 337/4, 5, 6, 7, 297, 168, 186, 187, 231, 232, 228, 248, 251, 252; 29/623

(56) References Cited

U.S. PATENT DOCUMENTS

| 3,566,003 | * | 2/1971 | Wislocky | 174/52.2 |
|---|---|---|---|---|
| 4,103,416 | * | 8/1978 | Sakamoto | 29/630 D |
| 4,538,212 | * | 8/1985 | Montgomery | 361/433 |
| 4,695,921 | * | 9/1987 | Robbins | 361/308 |
| 4,746,784 | * | 5/1988 | Vermij | 219/121 LD |
| 4,926,542 | * | 5/1990 | Bougger | 29/619 |
| 5,036,434 | * | 7/1991 | Kobayashi | 361/540 |
| 5,057,973 | | 10/1991 | Gouvernelle et al. | 361/534 |
| 5,296,833 | * | 3/1994 | Breen | 337/297 |

FOREIGN PATENT DOCUMENTS

| 0306809 | 3/1989 | (EP) | H01G/9/00 |
|---|---|---|---|
| 0392087 | 10/1990 | (EP) | H01G/9/00 |
| 0488130 | 6/1992 | (EP) | H01G/9/00 |
| 2186752 | 8/1987 | (GB) | H01H/85/06 |
| 63-84010 | 4/1988 | (JP) | H01G/9/12 |
| 2105513 | 4/1990 | (JP) | H01G/9/12 |

OTHER PUBLICATIONS

JP 4–3408 A. In: Patents Abstracts of Japan, E–1188, Apr. 10, 1992, vol. 16, No. 146.

* cited by examiner

Primary Examiner—Leo P. Picard
Assistant Examiner—Anatoly Vortman
(74) Attorney, Agent, or Firm—Michael D. Bednarek; Shaw Pittman

(57) ABSTRACT

A surface mounting type electronic component such as a solid electrolytic capacitor is provided which comprises an electronic element, a safety fuse wire having a base end electrically connected to the electronic element, and a resin package enclosing the electronic element together with the fuse wire. The fuse wire also has a tip end which is exposed at a face of the resin package, and the face of the resin package is formed with a layer-like terminal in electrical connection with the tip end of the fuse wire.

17 Claims, 4 Drawing Sheets

SURFACE MOUNTING TYPE ELECTRONIC COMPONENT INCORPORATING SAFETY FUSE

BACKGROUND OF THE INVENTION

1. Field of the Invention

This invention relates to a surface mounting type electronic component, such as a solid electrolytic capacitor, which incorporates a safety fuse wire such as a temperature fuse or an overcurrent fuse.

2. Description of the Related Art

Surface mounting type electronic components incorporating a safety fuse wire are known. A typical example is a fused surface mounting type solid electrolytic capacitor which is disclosed in Japanese Patent Application Laid-open No. 63(1988) -84010 or No. 2(1990)-105513 for example.

The solid electrolytic capacitor disclosed in either of the Japanese documents comprises a capacitor element which includes a capacitor chip and an anode wire projecting from the chip. The capacitor also includes a plate-like metal anode lead in direct electrical connection with the anode wire, and a plate-like metal cathode lead in electrical connection to the chip indirectly through a safety fuse wire. The capacitor element together with part of the respective leads is enclosed in a resin package, and the respective leads are bent outside the resin package for conveniently mounting to a surface of a circuit board.

According to the prior art arrangement, the provision of the anode and cathode leads inevitably increases the overall size and weight of the capacitor. Further, since the fuse wire need be attached to both of the capacitor chip and the cathode lead by wire bonding, the production cost of the capacitor increases due to the wire bonding operation which is relatively time- and labor-taking.

SUMMARY OF THE INVENTION

It is, therefore, an object of the present invention to provide a fused surface mounting type electronic component, in particular a solid electrolytic capacitor, which can eliminate or reduce the above described problems of the prior art.

The present invention also seeks to provide a method of conveniently making such an electronic component.

According to one aspect of the present invention, there is provided a surface mounting type electronic component comprising: an electronic element; a safety fuse wire having one end electrically connected to the electronic element; and a resin package enclosing the electronic element together with the fuse wire; wherein the other end of the fuse wire is exposed at a face of the resin package, said face of the resin package being formed with a layer-like terminal in electrical connection with said other end of the fuse wire.

Preferably, the fuse wire is partially enclosed in an elastic arc-extinguishing resin member. In case the electronic element is polar, the resin package may be externally formed with at least one indication, such as a groove, which is representative of the polarity of the electronic element.

According to one embodiment of the present invention, the electronic element has a face which is substantially parallel to said face of the resin package, said one end of the fuse wire being connected to said parallel face of the electronic element.

According to another embodiment of the present invention, the electronic element has a face which is substantially perpendicular to said face of the resin package, said one end of the fuse wire being connected to said perpendicular face of the electronic element. In this case, the fuse wire is bent for extending toward said face of the resin package.

Said other end of the fuse wire may made to project slightly from said face of the resin package. Alternatively, said other end of the fuse wire may be rendered flush with said face of the resin package.

Typically, the electronic element is a solid electrolytic capacitor element having a chip and an anode wire projecting from the chip. In this case, the resin package has another face at which a tip end of the anode wire is exposed, said another face of the resin package being formed with another layer-like terminal in electric connection with the tip end of the anode wire.

Similarly to the fuse wire, the tip end of the anode wire may project slightly from said another face of the resin package. Alternatively, the tip end of the anode wire may be flush with said another face of the resin package.

According to another aspect of the present invention, there is provided a method of making a surface mounting type electronic component comprising the steps of: attaching one end of a safety fuse wire to an electronic element; forming a resin package to enclose the electronic element together with the fuse wire so that the other end of the fuse wire is exposed at a face of the resin package; and forming a layer-like terminal on said face of the resin package in electrical connection with said other end of the fuse wire.

In one embodiment, said other end of the fuse wire projects from said face of the resin package to a greater degree immediately after forming the resin package but is subsequently cut to project to a smaller degree before forming the layer-like terminal.

In another embodiment, said other end of the fuse wire projects from said face of the resin package after forming the resin package but is subsequently cut to be flush with said face of the resin package before forming the layer-like terminal.

Other objects, features and advantages of the present invention will be fully understood from the following detailed description given with reference to the accompanying drawings.

DETAILED DESCRIPTION OF THE PREFERRED EMBODIMENTS

The preferred embodiments are now described taking a solid electrolytic capacitor as a typical example of surface mounting type electronic component to which the present invention may be applied.

Figure 1:
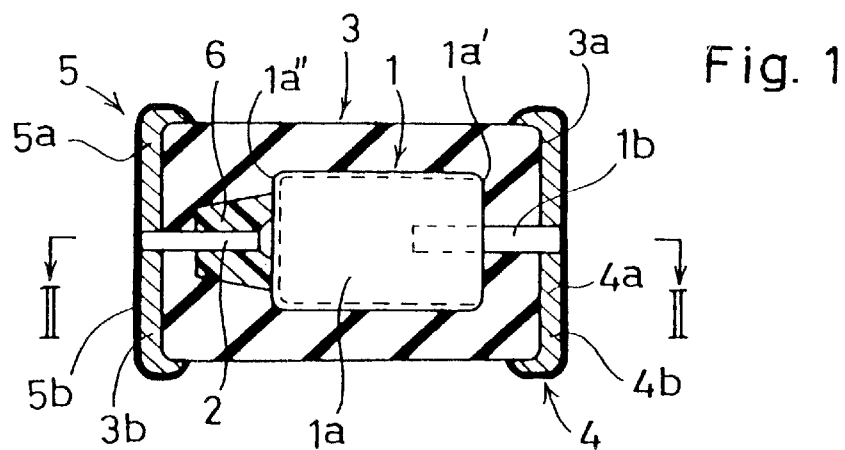
FIG. 1 is a sectional view showing a solid electrolytic capacitor embodying the present invention.
Figure 2:
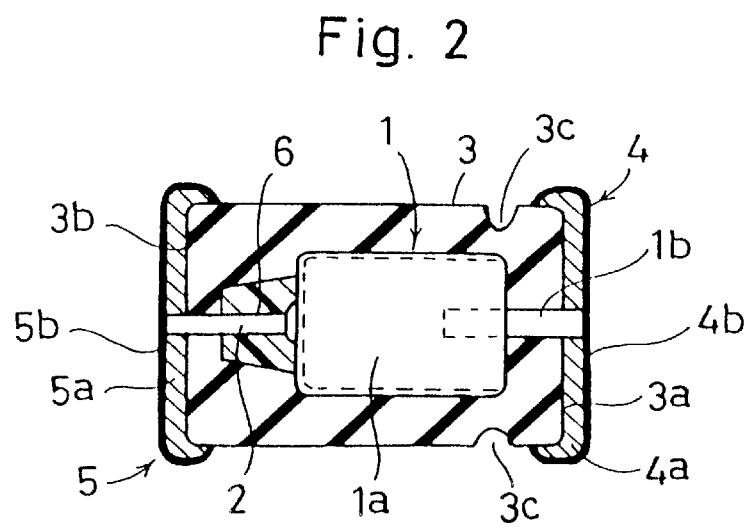
FIG. 2 is a sectional view taken on lines II—II in FIG. 1.
Figure 3:
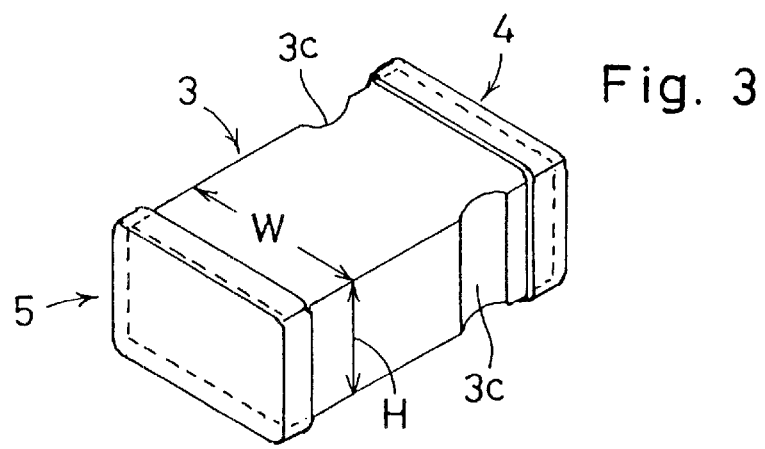
FIG. 3 is a perspective view showing the same capacitor.

Referring first to FIGS. 1 to 3 of the accompanying drawings, there is shown a solid electrolytic capacitor according to a first embodiment of the present invention. The capacitor may be a tantalum capacitor or an aluminum capacitor for example.

The capacitor of the first embodiment comprises a capacitor element 1 which includes a chip 1a and an anode wire 1b projecting from the chip 1a. The chip 1a has a first end face 1a' from which the anode wire 1b projects out, and a second ends face 1a" opposite to the first end face 1a'. The chip 1a may be a sintered mass of tantalum powder for example, in which case the anode wire 1b is also made of tantalum. The sintered mass for the chip 1a, which is initially porous, is subjected to oxidation for forming a dielectric substance (e.g. tantalum pentoxide), and then subjected to chemical treatment for forming a solid electrolytic substance (e.g. manganese dioxide) which works as an anode element.

The capacitor also includes a safety fuse wire 2 which may be made of solder for example to work as a temperature fuse or an overcurrent fuse. The safety fuse wire 2 is attached to the second end face 1a" and projects therefrom in a direction away from the first end face 1a'. The safety fuse wire 2 is partially surrounded by an elastic arc-extinguishing member 6 which may be made of silicone resin.

The capacitor element 1 together with the safety fuse wire 2 is enclosed in a package 3 of a thermosetting resin such as epoxy resin. The resin package 3 has a first end face 3a and a second end face 3b opposite to the first end face 3a. The resin package 3 also has a pair of side grooves 3c which are offset from the center of the package for visually indicating the polarity of the capacitor.

The anode wire 1b of the capacitor element 1 has a tip projecting slightly from the first end face 3a of the package 3.

Similarly, the fuse wire 2 has a tip projecting slightly from the second end face 3b of the package 3.

The first end face 3a of the package 3 is covered by a layer-like anode terminal 4 in electrical connection with the anode wire 1b. Similarly, the second end face 3b of the package 3 is covered by a layer-like cathode terminal 5 in electrical connection with the safety fuse wire 2. Each of the terminals 4, 5 comprises an electrically conductive undercoat layer 4a, 5a, and a metal plating layer 4b, 5b.

According to the arrangement described above, the anode wire 1b is connected directly to the anode terminal 4, whereas the safety fuse wire 2 is connected directly to the cathode terminal 5. Thus, there is no need for providing metal leads which are partially embedded in and partially projecting from the resin package 3, thereby preventing a size and weight increase which would be caused by the incorporation of such leads.

The capacitor described above may be made according to the following process. It should be appreciated that the following description of the process is made on the assumption that the capacitor element 1 itself is previously made.

Figure 4:
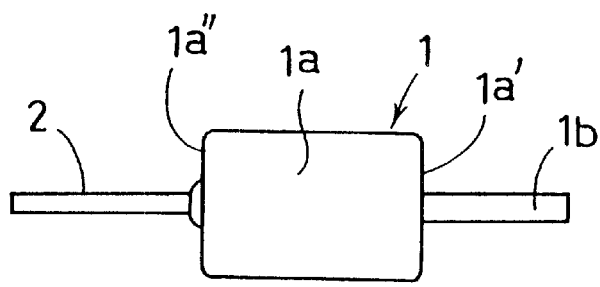
FIGS. 4 to 8 are views showing the succesive steps of making the same capacitor.

First, as shown in FIG. 4, a capacitor element 1 including a chip 1a and an anode wire 1b is prepared, and a safety fuse wire 2 is attached to the chip 1a by wire bonding or soldering for example. As previously described, the chip 1a has a first end face 1a' and a second end face 1a", and the fuse wire 2 is attached to the second end face 1a".

Figure 5:
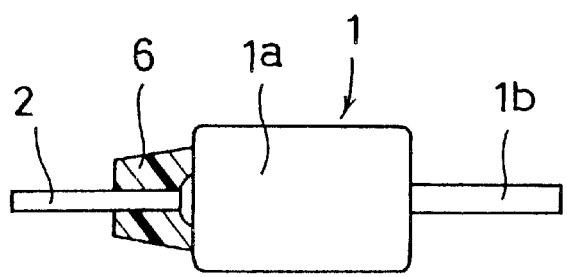

Then, as shown in FIG. 5, an elastic arc-extinguishing resin member 6 is formed to partially surround the fuse wire 2.

Figure 6:
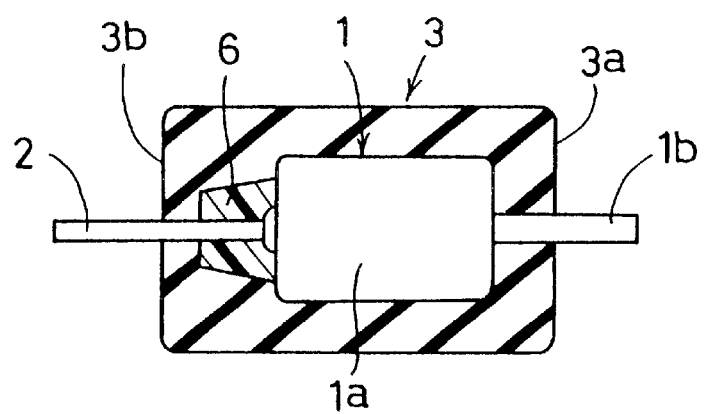

Then, as shown in FIG. 6, a resin package 3 is molded to enclose the capacitor element 1 and the arc-extinguishing member 6 with the anode wire 1b and fuse wire 2 partially projecting from the resin package 3. As previously described, the resin package 3 has a first end face 3a from which the anode wire 1b projects out, and a second end face 3b from which the fuse wire 2 projects out. The projecting portions of the anode wire 1b and fuse wire 2 are thereafer plated with a metal such as nickel or lead (Pb).

Figure 7:
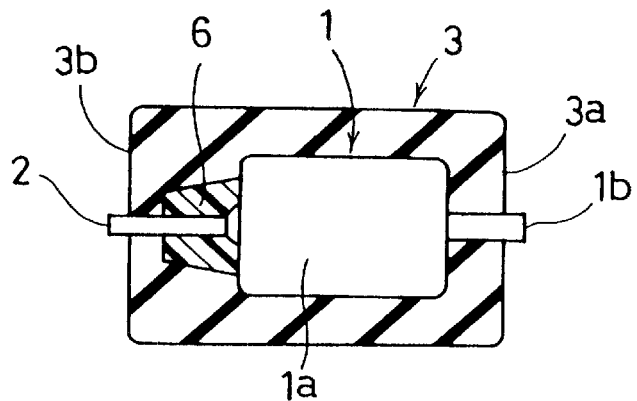

Then, as shown in FIG. 7, the projecting portions of the anode wire 1b and fuse wire 2 are cut to have a predetermined projecting length from the first and second end faces 3a, 3b, respectively. In FIG. 7, the metal planting for the anode wire 1b and the fuse wire 2 are indicated by reference signs P1 and P2, respectively, in a greatly exaggerated manner.

Figure 8:
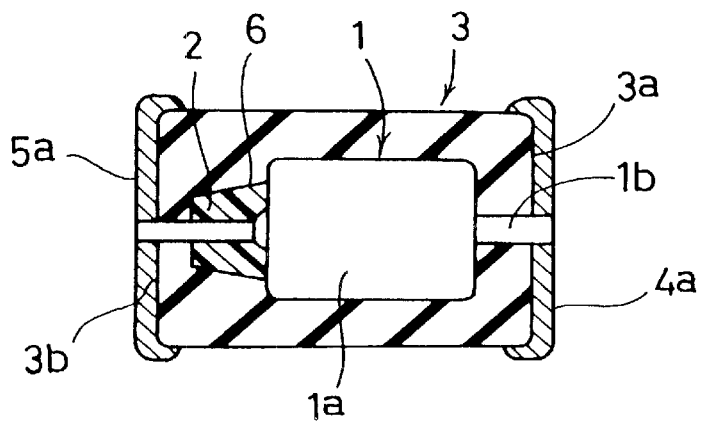

Then, as shown in FIG. 8, each of the first and second end faces 3a, 3b is covered by an electrically conductive undercoat layer 4a, 5a of a suitable thickness by applying a metal paste containing silver particles for example and drying the metal paste for curing. Obviously, each of the anode wire 1b and fuse wire 2 is brought into electrical connection with the undercoat layer 4a, 5a at the same time as the undercoat layer is formed.

Then, as shown in FIG. 1, the electrically conductive undercoat layer 4a, 5a is covered by a metal plating layer 4b, 5b, thereby providing a corresponding terminal 4, 5 in combination with the undercoating layer. The metal plating layer 4b, 5b may comprises a base plating layer of e.g. nickel and an exposed plating layer of e.g. solder.

According to the process described above, the anode wire 1b is brought into electrical connection with the anode terminal 4 at the time of forming the anode terminal 4 (the undercoat layer 4a in particular). Thus, a separate welding operation, which was conventionally required for connecting the anode wire to an anode lead, is no longer necessary, thereby simplifying the production process for reducing the production cost.

Similarly, the safety fuse wire 2 is brought into electrical connection with the cathode terminal 5 at the time of forming the cathode termial 5 (the undercoat layer 5a in particular). Thus, a wire bonding operation need be performed only with respect to the connection between the fuse wire 2 and the chip 1a of the capacitor element. In other words, a wire bonding operation, which was conventionally required for connecting the fuse wire 2 to a cathode lead, is no longer necessary, thereby also simplifying the production process for reducing the production cost.

Figure 9:
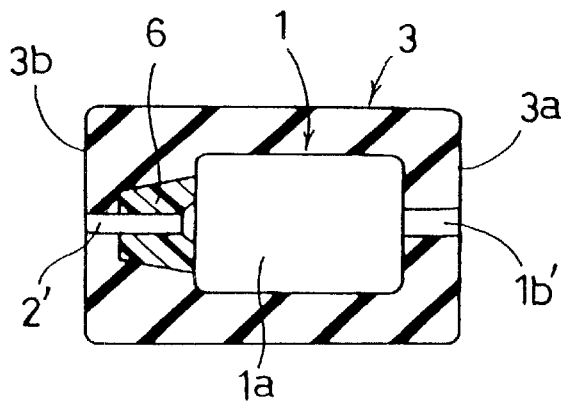
FIG. 9 is a sectional view showing another solid electrolytic capacitor embodying the present invention before forming its terminals.
Figure 10:
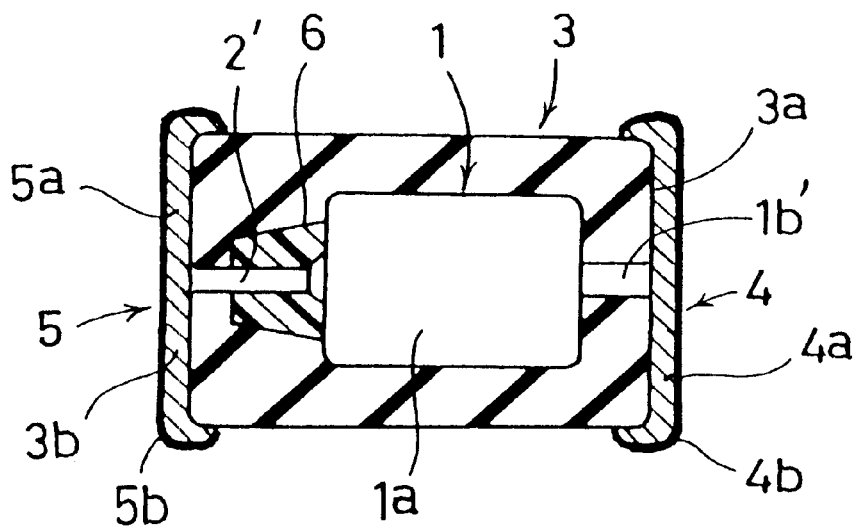
FIG. 10 is a sectional view showing the capacitor of FIG. 9 in its complete form.

FIGS. 9 and 10 show a solid electrolytic capacitor according to a second embodiment of the present invention. The capacitor of this embodiment is similar to that of the first embodiment but differs therefrom only in the following points.

According to the second embodiment, the capacitor element 1 has an anode wire 1b' whose tip is flush with the first end face 3a of the resin package 3. Similarly, a safety fuse wire 2 has a tip which is flush with the second end face 3b of the package 3. Apparently, the capacitor of the second embodiment may be made in substantially the same way as that of the first embodiment, excepting that the projecting portions of the anode wire and fuse wire (see FIG. 6) are completely cut off, as shown in FIG. 9.

Figure 11:
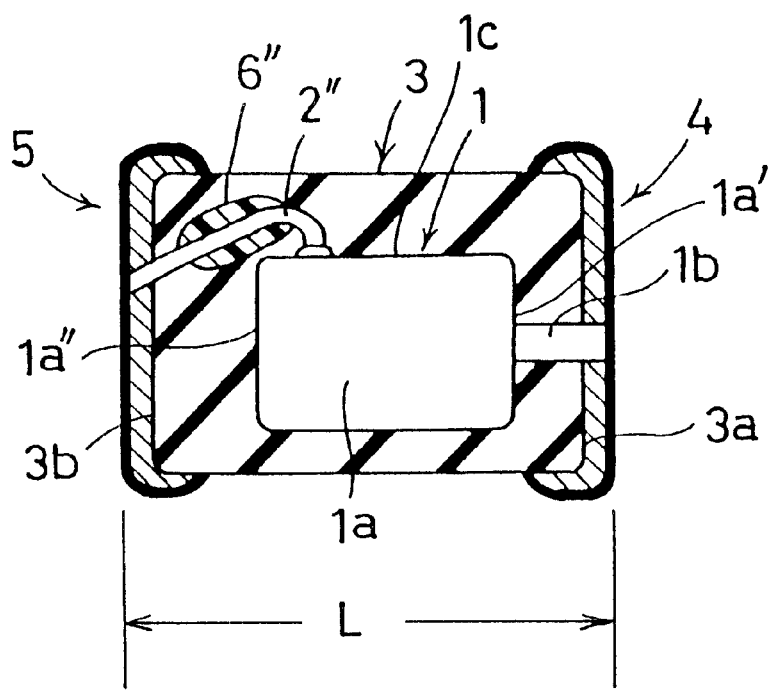
FIG. 11 is a sectional view showing a further solid electrolytic capacitor embodying the present invention.

FIG. 11 shows a solid electrolytic capacitor according to a third embodiment of the present invention. The capacitor of this embodiment is similar to that of the first embodiment but differs therefrom in that a safety fuse wire 2" partially surrounded by an elastic arc-extinguishing member 6 is attached to a face (side face) 1c of the capacitor chip 1a which is substantially perpendicular to the second end face 3b of the resin package 3. As a result, the fuse wire 2" is bent for extending toward the second end face of the package 3.

According to the third embodiment, since the fuse wire 2" is attached to the face 1c of the chip 1a which is substantially perpendicular to the second end face 3b of the resin package 3, the length of the fuse wire 2" can be made longer than if it is attached to the second end face 1a" of the chip 1a (see FIG. 1). As a result, the length L of the capacitor as a whole can be correspondingly decreased while allowing the fuse wire 2" to have a required length.

By contrast, the arrangement of the first or second embodiment (see FIGS. 1–10) is advantageous in case where it is desired to decrease the width W and/or height H (see FIG. 3) of the capacitor rather than the length of the capacitor.

The present invention being thus described, it is obvious that the same may be varied in many ways. For instance, the present invention may be applied to any surface mounting type electronic component which may incorporate a safety fuse wire. Such variations are not to be regarded as a departure from the spirit and scope of the present invention, and all such modifications as would be obvious to those skilled in the art are intended to be included within the scope of the following claims.

What is claimed is:

1. A surface mount solid electrolytic capacitor comprising:

a capacitor chip;

an anode wire connected to a first portion of the capacitor chip;

a safety fuse wire connected to a second portion of the electronic element;

a resin package enclosing the chip together with the fuse wire and the anode wire;

the resin package having a first end face and a second end face opposite to the first end face;

the anode wire having an end face substantially parallel to the first end face of the resin package, the end face of the anode wire being exposed from the first end face of the resin package and plated with a metal;

the fuse wire having an end face substantially parallel to the second end face of the resin package, the end face of the fuse wire being exposed from the second end face of the resin package and plated with a metal;

the first end face of the resin package and the plated end face of the anode wire being commonly covered by a first layer-like terminal;

the second end face of the resin package and the plated end face of the fuse wire being commonly covered by a second layer-like terminal; and the capacitor including no lead dedicated only for electrical connection.

2. A capacitor according to claim 1, wherein the fuse wire is partially enclosed in an elastic arc-extinguishing resin member.

3. A capacitor according to claim 1, wherein the capacitor chip is polar, the resin package is being externally formed with at least one indication which is representative of the polarity of the chip.

4. A capacitor according to claim 3, wherein the indication comprises a groove.

5. A capacitor according to claim 1, wherein the capacitor chip has a face which is substantially parallel to the second end face of the resin package, the fuse wire being connected to said parallel face of the chip.

6. A capacitor according to claim 1, wherein the capacitor chip has a face which is substantially perpendicular to the second end face of the resin package, the fuse wire being connected to said perpendicular face of the chip.

7. A capacitor according to claim 1, wherein the anode wire projects slightly from the first end face of the resin package so that the end face of the anode wire is lifted slightly from the first end face of the resin package.

8. A capacitor according to claim 1, wherein the end face of the anode wire is flush with the first end face of the resin package.

9. A capacitor according to claim 1, wherein the fuse wire projects slightly from the second end face of the resin package so that the end face of the fuse wire is lifted slightly from the second end face of the resin package.

10. A capacitor according to claim 1, wherein the end face of the fuse wire is flush with the second end face of the resin package.

11. A capacitor according to claim 1, wherein the metal for plating the exposed end face of the anode wire is selected from a group consisting of nickel and lead.

12. A capacitor according to claim 1, wherein the metal for plating the exposed end face of the fuse wire is selected from a group consisting of nickel and lead.

13. A capacitor according to claim 1, wherein each of the first layer-like terminal and the second layer-like terminal comprises an undercoat layer and an overcoat layer covering the undercoat layer.

14. A capacitor according to claim 13, wherein the first end face of the resin package is held in contact with the undercoat layer of the first layer-like terminal alone, the end face of the anode wire and the undercoat layer of the first layer-like terminal being commonly covered by the overcoat layer of the first layer-like terminal.

15. A capacitor according to claim 13, wherein the second end face of the resin package is held in contact with the undercoat layer of the second layer-like terminal alone, the end face of the fuse wire and the undercoat layer of the second layer-like terminal being commonly covered by the overcoat layer of the second layer-like terminal.

16. A capacitor according to claim 13, wherein the first end face of the resin package and the end face of the anode wire are commonly covered by the undercoat layer of the first layer-like terminal.

17. A capacitor according to claim 13, wherein the second end face of the resin package and the end face of the fuse wire are commonly covered by the undercoat layer.

* * * * *